Figure 12:
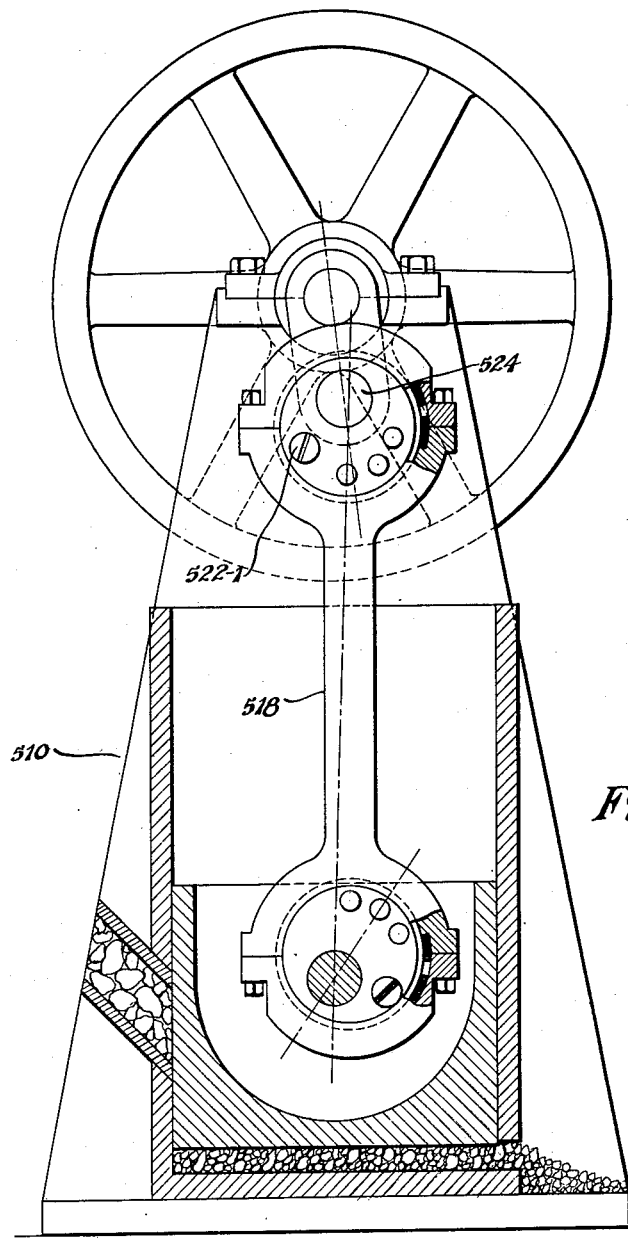

Jan. 22, 1935.  R. W. RIDER  1,988,571
MEANS FOR CONVERTING MOTION
Filed Nov. 4, 1930  3 Sheets-Sheet 1
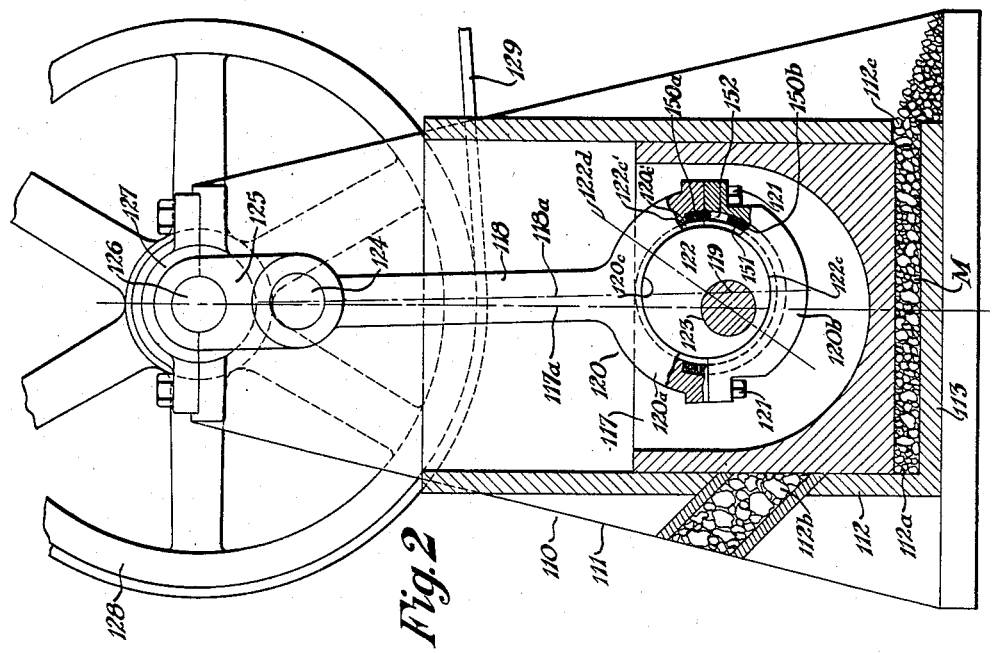
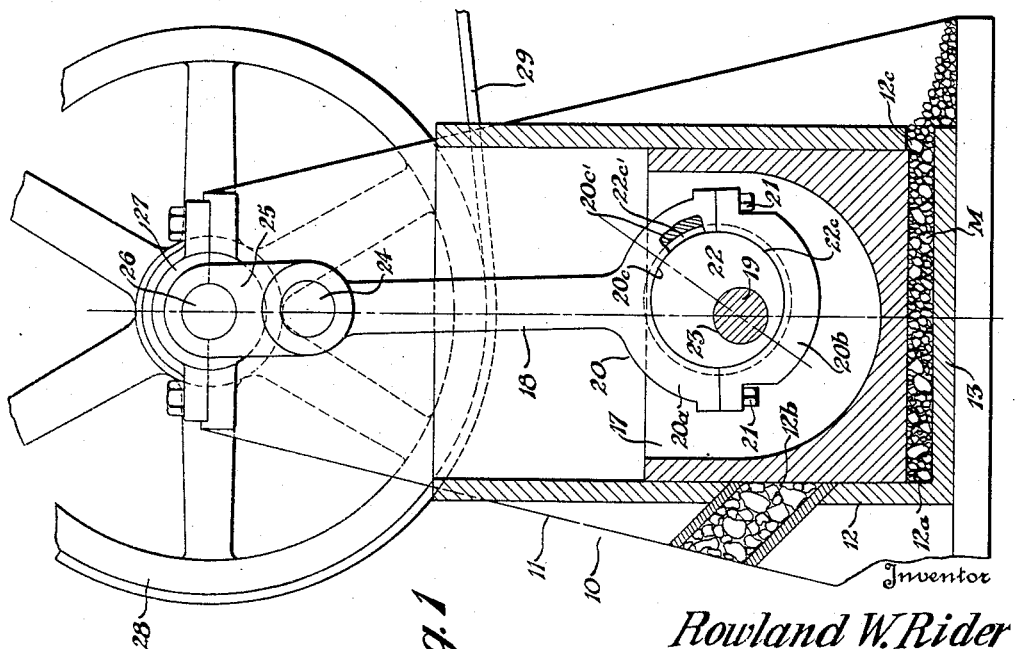
Inventor
Rowland W. Rider Jan. 22, 1935. R. W. RIDER 1,988,571
MEANS FOR CONVERTING MOTION
Filed Nov. 4, 1930 3 Sheets-Sheet 2
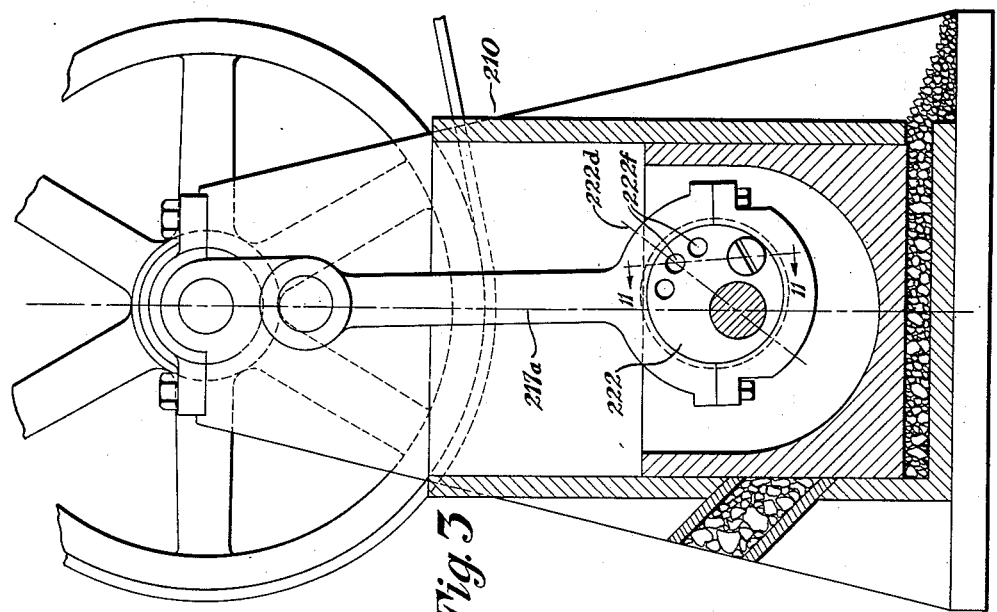
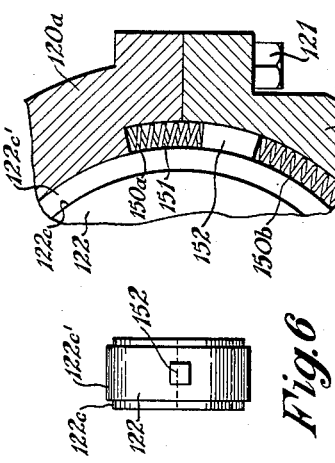
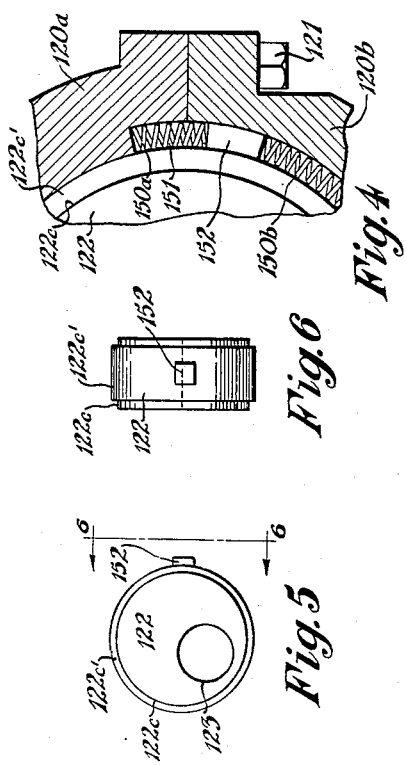
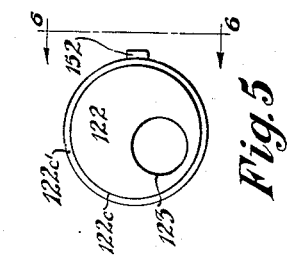
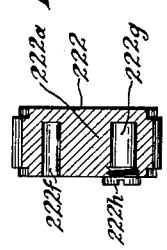
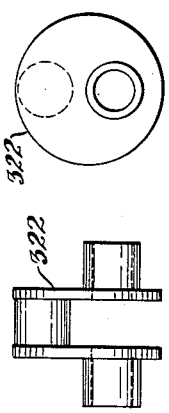
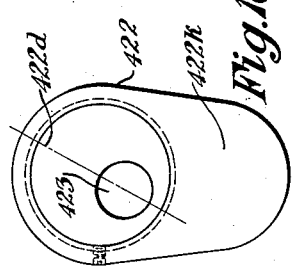
Inventor
Rowland W. Rider
By
Attorney Jan. 22, 1935.  R. W. RIDER  1,988,571
MEANS FOR CONVERTING MOTION
Filed Nov. 4, 1930  3 Sheets-Sheet 3

Inventor
Rowland W. Rider
By [signature]
Attorney

Patented Jan. 22, 1935

1,988,571

UNITED STATES PATENT OFFICE 1,988,571

MEANS FOR CONVERTING MOTION

Rowland W. Rider, Salt Lake City, Utah, assignor to Utah Royalty Corporation, Salt Lake City, Utah, a corporation of Utah Application November 4, 1930, Serial No. 493,393

3 Claims. (Cl. 74—44)

My invention relates to means or mechanisms for converting motion in one predetermined path to motion in another predetermined path, and the like, and which may include one member constrained to move in a predetermined path which may be, for example, a crank pin mounted upon the end of a crank which is secured for rotation on a suitably journalled shaft, and the crank pin thus being movable in a predetermined circular path by rotation of the crank.

The crank pin, for example, may be pivotally connected to one end of a connecting rod, and the other end of the connecting rod may be pivotally connected to another member which is constrained to move in another predetermined path, as for example, a rectilinearly reciprocating member which may be a piston or hammer member slidable back and forth in a cylinder guide member.

On the other hand, the other member may be a crank pin secured at the outer end of an oscillating lever arm mounted on a suitably journalled shaft, and the lever arm crank pin being pivotally connected to the connecting rod.

Either one of the members constrained to move in their respective predetermined paths may be a drive member, in which case the other member becomes a driven member.

In an internal combustion engine, for example, a rectilinearly reciprocating piston is connected by its connecting rod to a crank, which is rotated by the rectilinear movement applied to the piston by the expanding gases in the cylinder.

On the other hand, in the case of a hammer, power may be applied to the rotating crank which then becomes a driving member, and the reciprocating member becomes a driven member whose energy may be utilized for hammering, tamping, ramming, or crushing and the like.

In either case, due to the instantaneous change in direction of the motion of the reciprocating or oscillating member, at the end of each stroke thereof, and to the change in the velocity thereof from a maximum at the middle point of each stroke to zero at the end thereof, as ordinarily constructed, the other member of such a mechanism which may be, for example, the rotating crank and crank pin, as aforesaid, is subject to excessive stresses caused, first, by the necessity of absorbing the inertia forces of the reciprocating or oscillating member, and second, by the absorption of any forces externally applied thereto, as for example, the impact force applied to the piston of a hammer or crusher when it strikes the object being worked on, or in the case of an internal combustion engine, the maximum compression resistance, and the explosive force of the burning gases.

The objects of the present improvements include the provision of novel means including novel cushioning members for converting motion and the like, and adapted to overcome the foregoing and other objectionable features of the usual uncushioned means for converting motion.

The present invention includes the use of one or more cushioning members each rotatably mounted preferably for free rotation on one of the members constrained to move in a predetermined path, and the end of the connecting rod adjacent each cushioning member being pivotally connected with the cushioning member instead of being connected directly to the adjacent constrained member.

The present invention further includes particular relationships between the dimensions of all the parts of the mechanism, and of the masses of the moving parts thereof, and between such elements and the maximum inertia and resisting forces set up in or applied to the constrained members.

The foregoing and other objects are attained by the apparatus, parts, improvements, and combinations, which comprise the present invention, and which are particularly and distinctly pointed out and set forth in the appended claims forming part hereof.

Preferred embodiments of the invention are illustrated in the accompanying drawings forming part hereof, in which Figure 1 is a fragmentary view with portions in section illustrating a crusher including one embodiment of the present improvements;

Fig. 2, a similar view of another crusher including a second embodiment of the improvements wherein means are provided for limiting movement of the eccentric cushioning member relative to the connecting rod;

Fig. 3, a similar view of still another crusher including a third embodiment of the improvements wherein the center of gravity of the eccentric is offset from the median line thereto so that the eccentric pin is normally maintained out of line with the line of movement of the connecting rod, the longitudinal axis of the connecting rod passing through the center of the eccentric;

Fig. 4, an enlarged detached fragmentary sectional view illustrating the means for limiting the movement of the eccentric cushioning member of Fig. 2;

Fig. 5, a detached front elevation view of the eccentric of Fig. 2;

Fig. 6, a side elevation thereof as in the direction of the arrows 6—6, Fig. 5;

Fig. 7, a detached side elevation view of a crank mechanical equivalent of an eccentric, which may be utilized in any of the embodiments of the invention, instead of an eccentric;

Fig. 8, a front elevation thereof;

Fig. 9, a side elevation of a modified eccentric for use in connection with the present invention, and which includes means for varying the position of the center of gravity of the eccentric with respect to the median line thereof;

Fig. 10, a front elevation thereof;

Fig. 11, a detached sectional view of the eccentric of Fig. 3, as on line 11—11, Fig. 3; and Fig. 12, an elevation view with portions in section illustrating still another crusher including a fourth embodiment of the invention, in which an eccentric cushioning member is interposed between each of the members constrained for movement in a predetermined path and the connecting rod.

Similar numerals refer to similar parts throughout the drawings.

A crusher embodying the present improvements is indicated generally at 10, and includes a frame 11 at the lower end of which an upwardly opening cylinder 12 is mounted.

The cylinder 12 is closed at its lower end by a crushing head 13 upon which material M to be crushed is placed, and the material M may be introduced into the crushing chamber 12a as through an inlet aperture 12b formed in the wall of the cylinder 12, and the crushed material flows from the crushing chamber through an outlet aperture 12c formed in the cylinder 12.

The cylinder 12 extends vertically upwards from the cylinder head 13, and within the cylinder 12 a piston hammer 17 is operatively mounted, and the piston hammer 17 is thus a rectilinearly reciprocating member which is caused to be moved up and down within the cylinder 12 during operation of the crusher.

Rectilinear motion of the hammer 17 is imparted through a connecting rod 18, the lower end of which is cushion connected to the hammer 17, by means preferably including a wrist pin 19 mounted in the hammer, as follows.

The lower end of the connecting rod 18 is connected with an enclosing member indicated generally at 20 and which as illustrated includes one semi-circular portion 20a and another semi-circular portion 20b, the ends of which are secured to each other as by means of screws 21.

The enclosing member 20 may be however made of one piece.

Within the enclosing member 20 is rotatably mounted a circular eccentric cushioning member indicated generally by 22.

The cushioning member 22 as illustrated is formed of one piece of material.

The outer cylindric face 22c of the cushioning member has preferably formed thereon a peripheral flange 22c' which extends within and rotatably fits in a peripheral groove 20c' formed in the inner cylindric face 20c of the enclosing member.

A cylindric wrist pin bearing 23 is formed in the eccentric cushioning member, and the axis of the bearing 23 is eccentric with respect to the center of the outer cylindric face 22c of the cushioning member.

The wrist pin 19 extends through the cushioning member bearing 23; and the ends of the wrist pin are secured in the hammer 19.

The eccentric cushioning member 22 is freely rotatable on the wrist pin 19. The upper end of the connecting rod 18 is pivotally secured to a crank pin 24, which is mounted upon the outer end of a crank 25, and the crank 25 is secured for rotation on a shaft 26.

The shaft 26 is journalled in a bearing block 27, and the bearing block 27 is carried at the upper end of the frame 11.

A power in-put fly wheel 28 is secured to the shaft 26 and power may be delivered thereto as by means of a belt 29, which is driven by any suitable motor.

In the crusher 10, the mass of the hammer 17 is of such magnitude as to normally maintain the heavier portion of the eccentric cushioning member 22 above the axis of the wrist pin 19.

Accordingly when the crushing chamber 12a is filled to its maximum capacity, and the fly wheel 28 is driven by the belt 29, when the crushing hammer 17 strikes the material M to be crushed, the downward movement of the connecting rod 18 will cause the eccentric at each stroke to rotate about the wrist pin 19 until the material has been crushed so that it will not be struck by the hammer when extended to its maximum possible position of displacement on a downward stroke.

It is pointed out that on the upward stroke of the connecting rod 18, the mass of the hammer 17 will normally cause the eccentric to resume the position illustrated in Fig. 1.

In other words the stroke of the crushing hammer 17 is automatically increased by the operation of the eccentric cushioning member without causing any change in the speed of the drive motor.

In order to improve the crushing operation of a crusher embodying the present invention, it is preferred to maintain the cushioning member at a predetermined position relative to the reversely moving crushing member.

In Fig. 2 a crusher arranged for this purpose is indicated generally at 110, and includes a frame 111 at the lower end of which an upwardly opening cylinder 112 is mounted.

The cylinder 112 is closed at its lower end by a crushing head 113 upon which material M to be crushed is placed, and the material M may be introduced into the crushing chamber 112a as through an inlet aperture 112b formed in the wall of the cylinder 112, and the crushed material flows from the crushing chamber through an outlet aperture 112c formed in the cylinder 112.

The cylinder 112 extends vertically upwards from the cylinder head 113, and within the cylinder 112 a piston hammer 117 is operatively mounted, and the piston hammer 117 is thus a rectilinearly reciprocating member which is caused to be moved up and down within the cylinder 112 during operation of the crusher.

Rectilinear motion of the hammer 117 is imparted through a connecting rod 118, the lower end of which is cushion connected to the hammer 117, by means preferably including a wrist pin 119 mounted in the hammer, as follows.

The lower end of the connecting rod 118 is connected with an enclosing member indicated generally at 120 and which as illustrated includes one semi-circular portion 120a and another semi-circular portion 120b, the ends of which are secured to each other as by means of screws 121.

The enclosing member 120 may be however made of one piece.

Within the enclosing member 120 is rotatably mounted a circular eccentric cushioning member indicated generally by 122.

The cushioning member 122 as illustrated is formed of one piece of material.

The outer cylindric face 122c of the cushioning member has preferably formed thereon a peripheral flange 122c' which extends within and rotatably fits in a peripheral groove 120c' formed in the inner cylindric face 120c of the enclosing member.

A cylindric wrist pin bearing 123 is formed in the eccentric cushioning member, and the axis of the bearing 123 is eccentric with respect to the center of the outer cylindric face 122c of the cushioning member.

The wrist pin 119 extends through the cushioning member bearing 123; and the ends of the wrist pin are secured in the hammer 119.

The eccentric cushioning member 122 is freely rotatable on the wrist pin 119. The upper end of the connecting rod 118 is pivotally secured to a crank pin 124, which is mounted upon the outer end of a crank 125, and the crank 125 is secured for rotation on a shaft 126.

The shaft 126 is journalled in a bearing block 127, and the bearing block 127 is carried at the upper end of the frame 111.

A power in-put fly wheel 128 is secured to the shaft 126 and power may be delivered thereto as by means of a belt 129, which is driven by any suitable motor.

Means are provided for yieldingly maintaining the cushioning member 122 in a predetermined position with respect to the hammer 117, preferably so that the median line 122d of the eccentric cushioning member is angular with respect to the longitudinal axis 117a of the hammer 117, and with the longitudinal axis 118a of the connecting rod 118.

The yielding eccentric positioning means as illustrated include compression springs 150a and 150b which are preferably located in a segmental peripheral groove 151 formed in the inner face of the enclosing member 120, and a lug 152 extends outwardly from the outer cylindric face of the cushioning member 122 between opposite ends of the springs 150a and 150b.

The ends of the segmental peripheral groove 151 absorb the reaction of the springs 150a and 150b, and the springs yieldingly maintain the eccentric cushioning member 122 in any desired predetermined position relative to the enclosing member 120, and to the hammer 117, and thus yieldingly maintain the median line of the cushioning member 122d of the cushioning member 122 at any desired position.

The yielding positioning means enable a somewhat better operation of the crusher 110 than is attained by the use of the crusher 10.

In Fig. 3 is illustrated a crusher indicated generally by 210 which is generally similar to the crusher 10, with the exception that the eccentric cushioning member 222 is so formed and weighted that its center of gravity is off-set from the median line 222d thereof.

The off-setting of the center of gravity from the median line 222d is formed by forming a plurality of apertures 222f in the cushioning member, and by forming a socket 222g in the heavier portion 222a of the cushioning member, and the socket 222g being provided with a closure 222h, whereby mercury may be inserted in the socket 222g, for locating the center of gravity of the cushioning member at a position as illustrated, which will maintain the median line 222d of the cushioning member out of line with the longitudinal axis 217a of the hammer 217.

In Figs. 7 and 8 a mechanical equivalent of an eccentric cushioning member is illustrated in the form of a crank cushioning member 322 which may be substituted for the eccentric cushioning member in any of the embodiments of the invention, by making suitable changes in the members connected with the cushioning member.

The eccentric cushioning member 422 illustrated in Figs. 9 and 10 is generally similar to the eccentric 22, with the addition of wings 422k which are rotatably adjustable with respect to the bearing aperture 423 of the cushioning member 422, whereby the center of gravity of the cushioning member as a whole may be adjusted at any desired position with respect to the median line 422d of the cylindric portion thereof.

The crusher indicated generally at 510 is generally similar to the crusher 210, and includes a cushioning member 522—1 interposed between the upper end of the connecting rod 518 and the crank pin 524.

Both of the cushioning members of the crusher 510 are yieldingly maintained in predetermined positions with respect to the members upon which they are mounted, by means similar to that disclosed in the crusher 210 (Fig. 3).

Novel subject matter illustrated, but not described in detail and claimed herein, will be the subject matter of subsequent applications for patent.

I claim:

1. Means for connecting a crank shaft having a wrist pin with a reciprocating member having a wrist pin, the connecting means including an eccentric carried by each of the wrist pins and freely rotatable thereon, an enclosing member for each eccentric and means for rigidly connecting the enclosing members, each eccentric and its enclosing member being adapted to rotate relative to each other and means adapted to maintain the eccentric and enclosing member normally in such position relative to each other that a line drawn through the centre of the eccentric and the centre of the wrist pin will be in an angular relation to the line drawn through the centre of the crank shaft and the centre of the wrist pin.

2. Means for connecting a crank shaft having a wrist pin with a reciprocating member having a wrist pin, the connecting means including an eccentric carried by each of the wrist pins and freely rotatable thereon, an enclosing member for each eccentric and means for rigidly connecting the enclosing members, each eccentric and its enclosing member being adapted to rotate relative to each other and positioning means between each eccentric and its enclosing member comprising a mass on the eccentric adapted to maintain it normally in such position relative to its enclosing member that a line drawn through the centre of the eccentric and the centre of the pivot will be in a predetermined angular relation to the line drawn through the centre of the crank shaft and the centre of the wrist pin.

3. Means for connecting a crank shaft having a wrist pin with a reciprocating member having a wrist pin, the connecting means including an eccentric carried by each of the wrist pins and freely rotatable thereon, an enclosing member for each eccentric and means for rigidly connecting the enclosing members, each eccentric and its enclosing member being free to rotate relative to each other and a mass of each eccentric on one side of a line drawn through the centre of the eccentric and the centre of the wrist pin so that said line will be normally out of line with the line of movement drawn through the centre of the crank shaft and the centre of the wrist pin.

ROWLAND W. RIDER.